United States Patent [19]

Kruse et al.

[11] Patent Number: 5,037,962

[45] Date of Patent: Aug. 6, 1991

[54] β-MODIFICATION OF 1-(2,4-DINITRO-6-CHLORO-PHENYLAZO)-2-PROPIONYLAMINO-4-N-ETHYLAMINO-5-(2-METHOXY-ETHOXY)BENZENE, ITS PREPARATION AND ITS USE

[75] Inventors: Hubert Kruse, Kelkheim; Ulrich Bühler, Alzenau; Konrad Opitz, Liederbach; Willi Steckelberg, Hofheim, all of Fed. Rep. of Germany

[73] Assignee: Cassella AG, Frankfurt am Main, Fed. Rep. of Germany

[21] Appl. No.: 396,329

[22] Filed: Aug. 21, 1989

[30] Foreign Application Priority Data

Oct. 11, 1988 [DE] Fed. Rep. of Germany ....... 3834530

[51] Int. Cl.$^5$ ..................... C09B 67/48; C09B 29/08; D06P 1/18; D06P 3/36
[52] U.S. Cl. .................................. 534/575; 534/855; 534/887
[58] Field of Search ............................... 534/575, 855

[56] References Cited

U.S. PATENT DOCUMENTS

| | | | |
|---|---|---|---|
| 4,319,880 | 3/1982 | Opitz et al. | 534/855 X |
| 4,460,375 | 7/1984 | Sommer et al. | 534/855 X |
| 4,523,926 | 6/1985 | Brandt et al. | 534/850 X |
| 4,795,807 | 1/1989 | Buhler et al. | 534/581 |
| 4,802,889 | 2/1989 | Buhler et al. | 534/855 X |

FOREIGN PATENT DOCUMENTS

| | | | |
|---|---|---|---|
| 2950588 | 6/1981 | Fed. Rep. of Germany | 534/575 |
| 57-42982 | 3/1982 | Japan | 534/855 |
| 2027733 | 2/1980 | United Kingdom | 534/855 |

OTHER PUBLICATIONS

Haehnle et al., *Chemical Abstracts*, vol. 98, No. 90978a (1983).

Tappe et al., *Chemical Abstracts*, vol. 107, No. 135880k (1987).

Primary Examiner—Mary C. Lee
Assistant Examiner—Fiona T. Powers
Attorney, Agent, or Firm—Connolly and Hutz

[57] ABSTRACT

The β-modification, which is stable under dyeing conditions, of the dyestuff of the formula

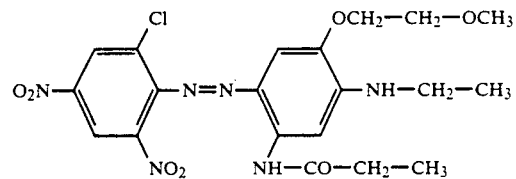

is prepared by heating the α-modification, which is unstable under dyeing conditions, at temperatures of 60° to 180° C. and the β-modification is useful in printing and dyeing fiber materials of cellulose esters, synthetic linear polyesters or mixed fabrics of the polyester fiber material with wool or viscose staple.

1 Claim, 2 Drawing Sheets

β-MODIFICATION OF 1-(2,4-DINITRO-6-CHLORO-PHENYLAZO)-2-PROPIONYLAMINO-4-N-ETHYLAMINO-5-(2-METHOXY-ETHOXY)BENZENE, ITS PREPARATION AND ITS USE

The present invention relates to a new crystallographic modification ("β-modification"), which is stable under dyeing conditions, of the dyestuff of the formula I

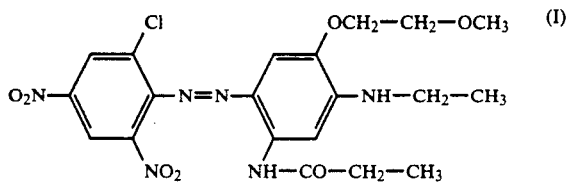

with the x-ray diffraction diagram (Cu-Kα radiation) having the following lines at the diffraction angle $2\theta$ (°):
lines of high intensity: 4.8; 25.4; 26.2;
lines of medium intensity: 7.6; 8.1; 14.5; 19.7; 20.5; 21.5; 22.9; 23.8; 24.3
lines of low intensity: 6.2; 6.6; 11.1; 11.8; 12.4; 13.0; 13.6; 15.3; 18.7; 28.0; 28.7; 29.4; 30.5; 31.5; 32.3.

Figure 1:
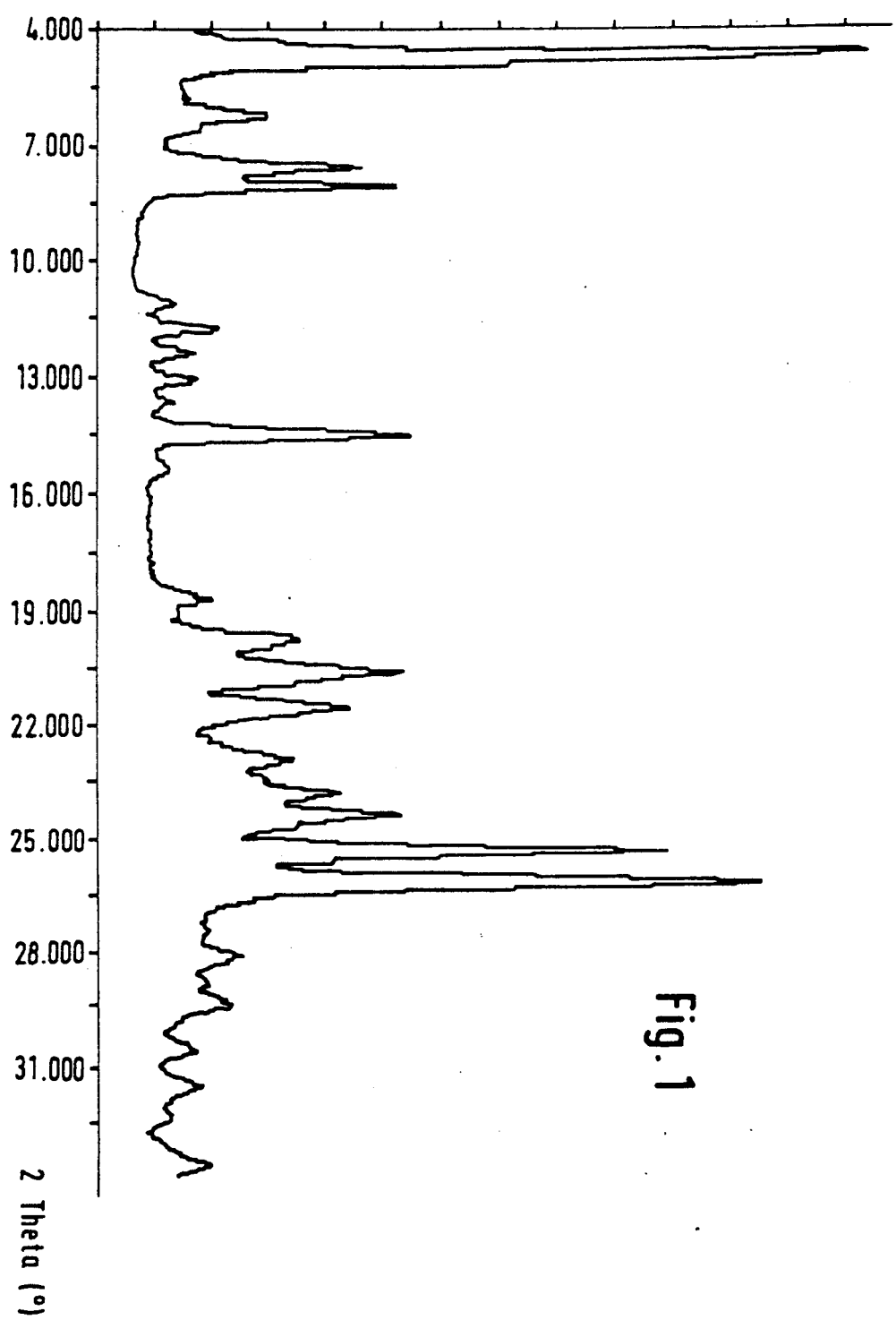
FIG. 1 is an x-ray defraction pattern for a dyestuff of this invention. p

The x-ray diffraction diagram recorded with Cu-Kα radiation on the β-modification which is stable under dyeing conditions is shown in FIG. 1. A computer-assisted Siemens D 500 Pulverdifraktometer was used to record the x-ray diffraction diagrams.

The dyestuff of the above-mentioned formula is obtained by diazotisation of 2,4-dinitro-6-chloroaniline in concentrated sulfuric acid and subsequent coupling of the resulting diazo solution with 4-propionylamino-2-N-ethyl-amino-(2-methoxy)-ethoxy-benzene in an aqueous mineral acid medium. The α-modification, which is unstable under dyeing conditions, is obtained, this modification having an inadequate stability under the dyeing conditions which arise in practice and having only an inadequate stability to heat exposure during the drying process for the preparation of dyestuff powders.

Figure 2:
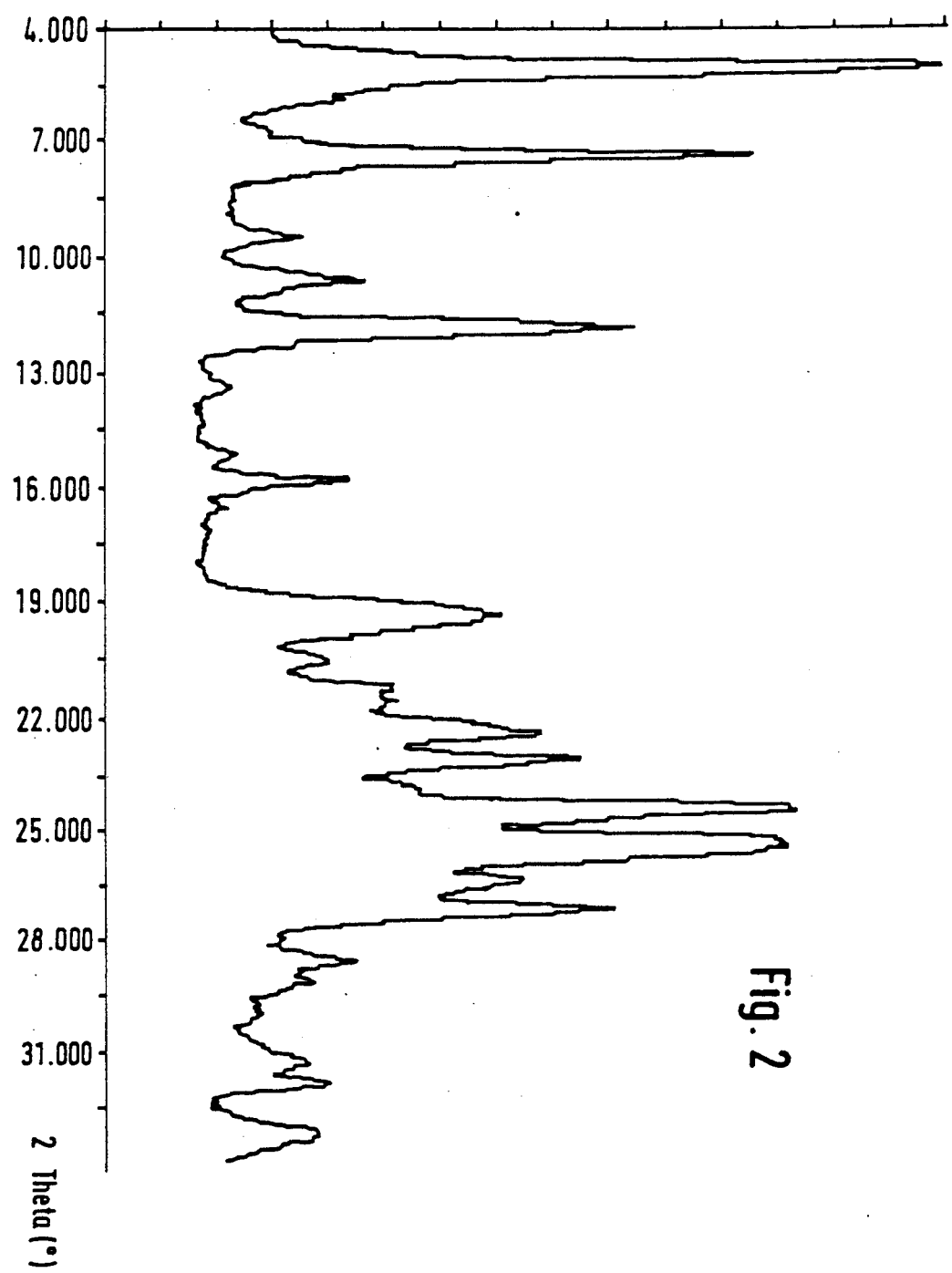
FIG. 2 is an x-ray defraction pattern of the starting material from which the dyestuff of this invention is obtained.

The α-modification, which is unstable under dyeing conditions, has the x-ray diffraction diagram (Cu-Kα radiation) shown in FIG. 2, with the following lines at diffraction angle $2\theta$ (°):
lines of high intensity: 5.2; 7.5; 11.9; 23.2; 24.5; 25.5; 27.2;
lines of medium intensity: 5.9; 9.5; 10.8; 15.9; 19.4; 20.5; 21.3; 22.5; 23.9; 26.5; 28.6; 29.2; 31.3; 31.9; 33.2;
lines of low intensity: 13.4; 15.2; 16.5.

The α-modification, which is unstable under dyeing conditions, of the dyestuff of the formula I is converted into the β-modification, which is stable under dyeing conditions, by heating at temperatures of 60° to 180° C., preferably 80° to 140° C. This heating can be carried out in various ways. As a rule, the α-modification, which is unstable under dyeing conditions, is heated at the temperatures mentioned in aqueous suspension, advantageously while stirring. It is advantageous to adjust the pH of the aqueous suspension to approximately neutral. If appropriate, surface-active compounds and/or solvents are added to the suspension to be heated. If the suspension is heated at temperatures above the boiling point of the liquid phase, it is necessary to apply increased pressure. Heating is carried out until the α-modification has been converted into the β-modification, which as a rule takes 2 to 6 hours. The conversion can be monitored by radiography or microscopy on samples taken.

Surface-active compounds can be anionic, cationic or non-ionic and are, for example, dispersion agents, emulsifiers or wetting agents. Examples of suitable surface-active compounds are sodium diisobutylnaphthalenesulphonate, addition products of ethylene oxide and/or propylene oxide onto fatty alcohols, such as, for example, the addition product of 25 mol of ethylene oxide onto 1 mol of stearyl alcohol or of 2 mol of ethylene oxide onto 1 mol of lauryl alcohol, mixtures of alkyl-dimethylbenzylammonium chlorides, fatty acid polyglycol esters, tertiary phosphoric acid esters, alkali metal salts of lignin sulphonates, polyvinyl-sulphonates, sulfite cellulose waste liquor or oxalkylated novalaks.

The surface-active agents can be used individually or in combination with one another. 1 to 500% by weight, preferably 5 to 400% by weight, of surface-active agents, based on the α-modification to be converted, are usually employed.

If one or more solvents are added to the aqueous suspension, particularly suitable solvents are those which are water-soluble, such as, for example, methanol, ethanol, isopropanol and isobutanol.

The heating can also be carried out in the course of customary conversion of the dyestuff into a very fine distribution (finishing). In this procedure, the α-modification, which is unstable under dyeing conditions, is converted under wet conditions into a finely dispersed form on customary devices, such as, for example, mills or kneaders, preferably with the addition of dispersing agents, such as, for example, polyvinylsulphonates, condensation products of naphthalenesulphonic acid and formaldehyde or of phenol, formaldehyde and sodium bisulphite, alkali metal salts of lignin sulphonates or sulfite cellulose waste liquor, and if appropriate other customary additives (such as, for example, dust prevention, frost protection and wetting agents, agents for preventing drying out and the like). Examples of suitable mills are ball, vibratory, bead or sand mills. If the conversion of the dyestuff into a finely dispersed form is carried out at the above temperatures of 60° to 180° C., preferably 80° to 140° C., the α-modification, which is unstable under dyeing conditions, of the dyestuff of the formula I is also converted into the β-modification, which is stable under dyeing conditions, of the dyestuff of the formula I during this procedure. If the α-modification, which is unstable under dyeing conditions, is converted into the β-modification, which is stable under dyeing conditions, in the context of fine division, temperatures of 60° to 95° C. are usually maintained here.

If the β-modification, which is stable under dyeing conditions, of the dyestuff of the formula I has not been prepared by heating in the course of conversion into a very fine division and therefore is not already in a very fine division, it is converted into a very fine division in the above-mentioned manner which is known per se for use for dyeing or for the production of dye preparations. For the production of dye preparations, if appropriate customary additives, such as, for example, dust prevention, frost protection and wetting agents, agents for preventing drying out, agents for improving the flow properties and the like, are added here in a manner which is known per se.

During the fine division, the dyestuff particles are comminuted mechanically until an optimum specific surface area is reached and sedimentation of the dyestuff particles in a liquid dyestuff formulation or in the dyebath is as low as possible. When the fine division has ended, the size of the dyestuff particles is in general about 0.1 to 10 μm.

The drying process required for the preparation of dyestuff powders is carried out in commercially available spray driers.

The preparation of dyestuff powders by spray drying of the finely divided dyestuff particles in the β-modification can be carried out with a relatively high exposure of the dispersion to heat without this causing damage. A significant improvement in the space-time yield thus results by increasing the ΔT value between the intake and output temperature of the drier air.

The liquid or pulverulent preparations of the β-modification, which is stable under dyeing conditions, are of unlimited suitability, in contrast to comparable preparations of the α-modification, for dyeing textile materials of cellulose fibers, synthetic linear polyesters, such as polyethyleneglycolterephthalate, or mixed fabrics of polyester with wool or viscose staple at temperatures between 90° and 210° C.

Preparations containing the β-modification, which is stable under dyeing conditions, do not flocculate out in an aqueous medium and under the action of high temperatures, which is of particular importance for dyeing wound packages, for example cheeses.

The considerably better suitability of the preparations containing the β-modification, which is stable under dyeing conditions, in practice already manifests itself in the very diverse dyeing tests by significantly superior test results. For example, this is the case in the heat stability test, which is a criterion of the liquor stability, in the speck test, which leads to a conclusion on the suitability for pad-dyeing, and in the bulk test on mixed fabrics, such as those of polyester fibers and viscose staple.

The bulk test enables the suitability of disperse dyestuff preparations for dyeing of wound packages to be tested under conditions in practice with a low expenditure.

In the following examples, parts and percentages are parts by weight and percentages by weight, unless noted otherwise.

EXAMPLE 1 a) 100 parts of the dyestuff of the formula I are prepared by diazotisation of 2,4-dinitro-6-chloro-aniline in concentrated sulfuric acid and by coupling the diazo solution thus obtained with a weakly acid solution of 4-propionylamino-2-N-ethylamino-(2-methoxy)ethoxybenzene. The coupler employed can be synthesized, for example, by ethylation of 2-amino-4-propionylamino-(2-methoxy)ethoxybenzene with diethylsulphate or by reductive monoethylation of 2-amino-4-propionylamino-(2-methoxy)ethoxybenzene with acetaldehyde. The dyestuff (α-modification) is isolated as a water-moist press-cake by filtration and subsequent washing until neutral.

b) 100 parts of the dyestuff prepared according to a) are suspended in 500 ml of water, the suspension is stirred at 130°–135° C. for 2 hours and the resulting β-modification of the dyestuff is filtered off as a water-moist press-cake, after cooling.

c) The dyestuff prepared according to b) is finely divided (particle size of up to 90% equal to or less than 1 μm) with 110 parts of an Na lignin sulphonate, 7 parts of an oxalkylated novolak and water in a sand mill, while cooling, and the mixture is dried in a spray drier at an air intake temperature of 155° C. and an output temperature of 80° C. A pulverulent speck-free formulation of the dyestuff is obtained, this formulation meeting all the technological requirements.

d) If the dyestuff prepared according to a) is employed in Example 1c), a powder which leads to highly speckled pad-dyeings is obtained under the drying conditions described.

EXAMPLE 2

The dyestuff prepared according to Example 1 b) (β-modification) is ground with 50 parts of an Na lignin sulphonate, 25 parts of a condensation product of naphthalene sulphonic acid and formaldehyde and water in a sand mill, while cooling. The resulting 27% strength liquid formulation is stable on storage and is distinguished by level dyeings, which are fast to rubbing, on wound packages and an excellent liquor stability.

EXAMPLE 3

The dyestuff prepared according to Example 1a) (α-modification) is made into a paste with 110 parts of an Na lignin sulphonate, 7 parts of an oxalkylated novolak and water in a stirred vessel and the paste is rendered neutral and stirred at 90°–95° C. until complete conversion into the β-modification, which is stable under dyeing conditions, has taken place (2 to 4 hours). After cooling, the suspension is processed to a dyestuff powder as described in Example 1c). A pulverulent formulation which meets all the technological requirements is obtained.

EXAMPLE 4

The dyestuff prepared according to Example 1a) (α-modification) is heated at 90°–95° C. in an aqueous suspension containing 10% of isobutyl alcohol for 2 hours and, after cooling, is filtered off. The water-moist suction filter cake (β-modification) is finely divided with 110 parts of an Na lignin sulphonate, 7 parts of an oxalkylated novolak and water in accordance with Example 1c) and the mixture is spray-dried. A pulverulent speck-free formulation of the dyestuff is obtained, this meeting all the technological requirements.

EXAMPLE 5

The dyestuff prepared according to Example 1a) (α-modification) is ground to a fine division (particle size of up to 90% equal to or less than 1 μm) with 110 parts of an Na lignin sulphonate, 7 parts of an oxalkylated novolak and water in a sand mill at 80°–85° C. The α-modification, which is unstable under dyeing conditions, is in this way converted into the β-modification, which is stable under dyeing conditions. The preparation is dried in a spray drier as in Example 1c). The resulting pulverulent formulation is free from specks and meets all the technological requirements.

What is claimed is:

1. The β-modification, stable under dyeing conditions, of the dyestuff of the formula
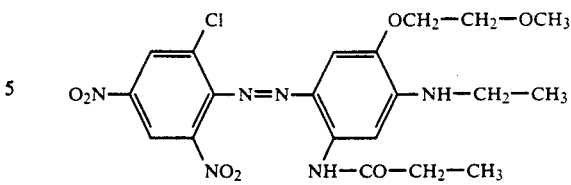
with the x-ray diffraction pattern (Cu-Kα radiation) having the following lines at the diffraction angle $2\theta$ (°):
lines of high intensity: 4.8; 25.4; 26.2;
lines of medium intensity: 7.6; 8.1; 14.5; 19.7; 20.5; 21.5; 22.9; 23.8; 24.3;
lines of low intensity: 6.2; 6.6; 11.1; 11.8; 12.4; 13.0; 13.6; 15.3; 18.7; 28.0; 28.7; 29.4; 30.5; 31.5; 32.3.
* * * * *